United States Patent
Knees et al.

(10) Patent No.: US 10,374,941 B2
(45) Date of Patent: Aug. 6, 2019

(54) DETERMINING AGGREGATION INFORMATION

(71) Applicant: Hewlett Packard Enterprise Development LP, Houston, TX (US)

(72) Inventors: Max C Knees, Fort Collins, CO (US); Joseph Elisha Taylor, Fort Collins, CO (US); Lawrence M Besaw, Fort Collins, CO (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 356 days.

(21) Appl. No.: 15/032,602

(22) PCT Filed: Oct. 30, 2013

(86) PCT No.: PCT/US2013/067547
§ 371 (c)(1),
(2) Date: Apr. 27, 2016

(87) PCT Pub. No.: WO2015/065385
PCT Pub. Date: May 7, 2015

(65) Prior Publication Data
US 2016/0261489 A1    Sep. 8, 2016

(51) Int. Cl.
*G06F 15/173* (2006.01)
*H04L 12/709* (2013.01)
*H04L 29/06* (2006.01)
*H04L 12/24* (2006.01)
*H04L 12/26* (2006.01)

(52) U.S. Cl.
CPC ......... *H04L 45/245* (2013.01); *H04L 41/022* (2013.01); *H04L 41/0213* (2013.01); *H04L 69/14* (2013.01); *H04L 43/0811* (2013.01); *Y02D 50/30* (2018.01)

(58) Field of Classification Search
CPC ..... H04L 12/24; H04L 29/10; H04L 43/0811; H04L 41/022; H04L 45/245; H04L 69/14; H04L 41/0213
See application file for complete search history.

(56) References Cited

U.S. PATENT DOCUMENTS

| | | |
|---|---|---|
| 7,760,631 B2 | 7/2010 | Basturk |
| 8,443,065 B1 | 5/2013 | White |
| 9,258,195 B1 * | 2/2016 | Pendleton ............... H04L 41/12 |
| 2010/0290473 A1 | 11/2010 | Enduri et al. |
| 2011/0093579 A1 | 4/2011 | Koizumi et al. |
| 2012/0093004 A1 | 4/2012 | Nishi |

(Continued)

OTHER PUBLICATIONS

Extreme Networks, Inc., Exploring New Data Center Network Architectures with Multi-switch Link Aggregation (M-LAG), White Paper, Jul. 29, 2011, 5 pages http://www.extremenetworks.com/libraries/whitepapers/WPDCArchitectureswM-LAG1750.

(Continued)

*Primary Examiner* — Benjamin M Thieu (57) ABSTRACT

A technique includes determining a network interface aggregation information for a given network device. Determining the aggregation includes determining whether the network device is capable of providing first data identifying an aggregation and selectively inferring the aggregation based at least in part on other data if a determination is made that the network device is incapable of providing the first data.

15 Claims, 6 Drawing Sheets

(56) References Cited

U.S. PATENT DOCUMENTS

| | | | |
|---|---|---|---|
| 2012/0131662 A1* | 5/2012 | Kuik | G06F 9/45558 726/11 |
| 2012/0275311 A1 | 11/2012 | Ivershen et al. | |
| 2012/0300773 A1* | 11/2012 | Maeda | H04L 61/103 370/390 |
| 2012/0307828 A1 | 12/2012 | Agarwal et al. | |
| 2013/0259059 A1 | 10/2013 | Yamada | |
| 2014/0064056 A1* | 3/2014 | Sakata | H04L 41/00 370/216 |
| 2014/0185461 A1* | 7/2014 | Gautreau | H04L 45/245 370/244 |
| 2015/0372862 A1* | 12/2015 | Namihira | H04L 12/44 370/254 |

OTHER PUBLICATIONS

Hewlett-Packard Company, HP FlexFabric Reference Architecture, Technical White Paper, Aug. 5, 2012, 70 pages http://h20195 www2 hp com/v2/GetPDF aspx/4AA3 4150ENW pdf.

International Searching Authority, The International Search Report and the Written Opinion, dated Jul. 28, 2014, 9 Pages.

Netgear Prosafe, ProSafe® 24-port 10 Gigabit Stackable L2+ Managed Switch Data Sheet XSM7224S, Data Sheet, Jan. 19, 2012, 14 pages http://www netgear com/images/XSM7224S DS 19Jan1218-10913 pdf.

Oracle, System Administration Guide: Network Interfaces and Network Virtualization, 2010, 10 pages http://docs oracle com/cd/E19120-01/open solaris/819-6990/fpjvl/index html.

\* cited by examiner

DETERMINING AGGREGATION INFORMATION

BACKGROUND

Link aggregation typically has been used to increase the communication bandwidths and fault tolerance capabilities of network devices. With link aggregation, multiple physical links (network cables, for example) between two network devices form a single logical link, or link aggregation group (LAG), which has a larger available bandwidth than any of the individual physical links. Moreover, link aggregation provides for failover, in that should one of the physical links of the LAG fail, communication between the network devices continues using the remaining physical links.

DETAILED DESCRIPTION

Figure 1:
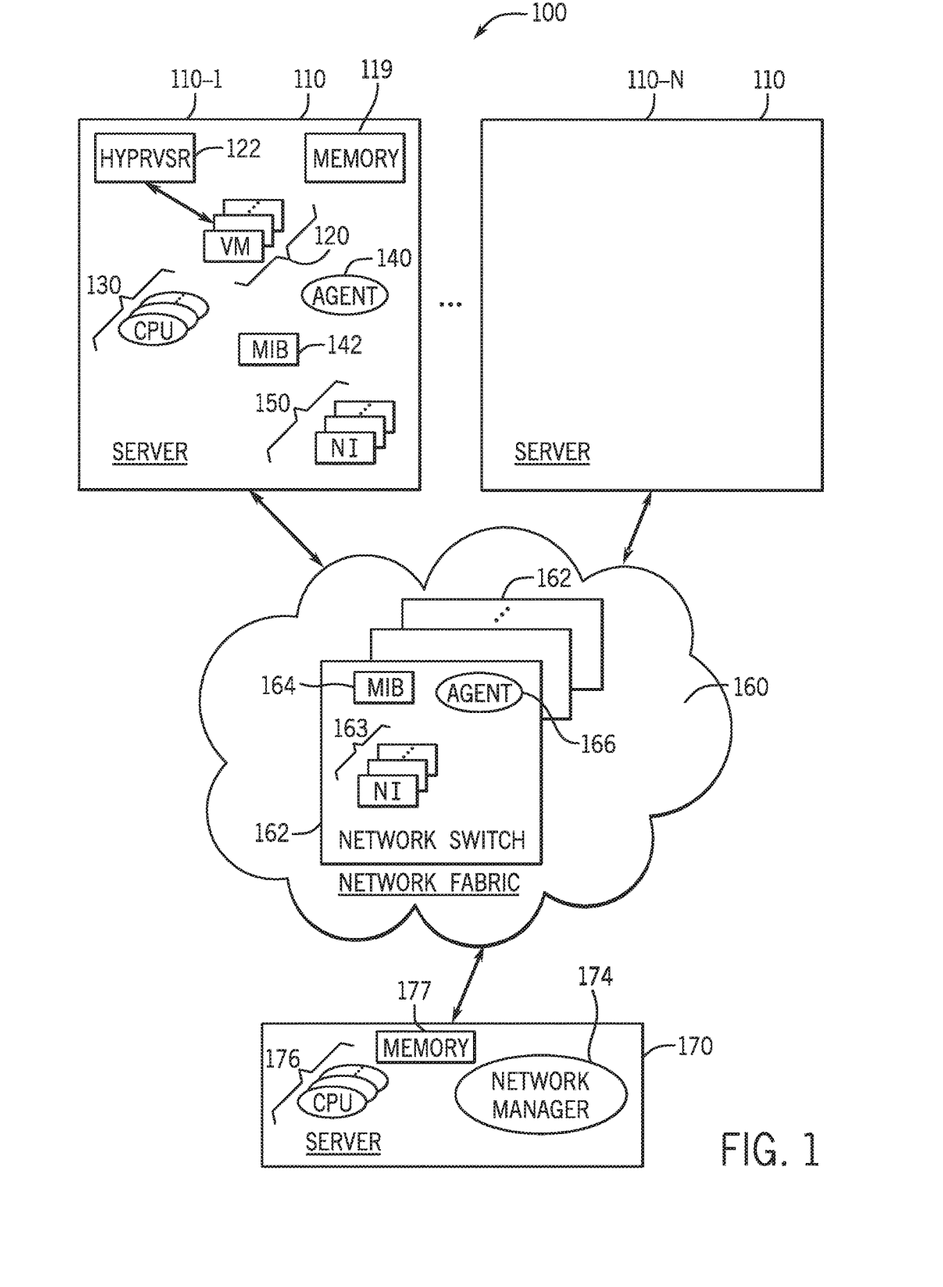
FIG. 1 is a schematic diagram of a network according to an example implementation.

Referring to FIG. 1, an example network 100 may include servers 110 (N servers 110-1 . . . 110-N, being depicted in FIG. 1 as examples), which may provide a variety of services for a datacenter, such as services relating to serving Internet, or "web," pages to public consumers; database services; email services; and so forth. A given server 110 may provide the platform for multiple virtual machine (VMs). In this regard, for the example implementation that is depicted in FIG. 1, the server 110-1 has multiple VMs 120, which are supervised by a hypervisor 122.

For purposes of ensuring that a given server 110 (and its VMs) remain visible and functional for such events as a local network port outage or an access switch outage, the network ports, or interfaces, of a given server 110 (such as network interfaces 150 of the server 110-1, for example) may be connected in one or multiple link aggregation groups(s) (LAG(s)) with network interfaces 163 of one or multiple network switches 162 (of network fabric 160). Thus, the edge of network encroaches beyond the network fabric 160 and onto the server 110 itself. Two or more network interfaces 150 of a given server 110 may be physically connected to network multiple network interfaces 163 of a given network switch 162 (to form a LAG) or may be physically connected to network interfaces 163 of multiple network switches 162 (to form a split LAG (SLAG)).

Figure 2:
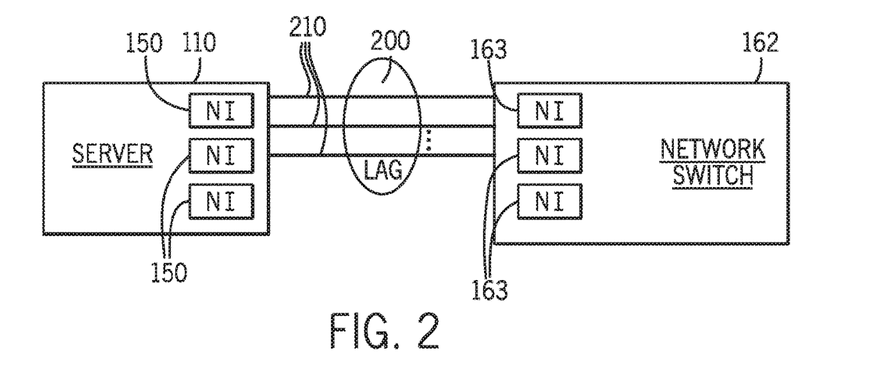
FIG. 2 is an illustration of a link aggregation group (LAG) used for communications between a server and a network switch according to an example implementation.

As a more specific example, FIG. 2 depicts an example LAG 200 that is used by a server 110 and network switch 162. Referring to FIG. 2 in conjunction with FIG. 1, to form the LAG 200, an aggregation of network interfaces 150 of the server 110 are physically connected by network cables 210 to an aggregation of network interfaces 163 of the network switch 162.

An aggregation is a logical representation of the network interfaces on a given network device (such as a network switch or a server), which are grouped together to form a LAG or SLAG. For a given aggregation, one of the network interfaces is the master, or "aggregator;" and the remaining network interface(s) are the member(s) of the aggregation. Thus, for the example of FIG. 3, the network interfaces 150 of the server 110 form a server aggregation, with one of the network interfaces 150 being the aggregator. Likewise, from the side of the network switch 162, one of the network interfaces 163 is the aggregator of the switch aggregation, with other network interface(s) 163 being the member(s) of the aggregation. The interfaces 150 and 163 of the LAG are connected by physical ports (which are connected by physical cables 210). As described herein, the layer 2 (L2), or physical characteristics of the physical ports, such as the Media Access Control (MAC) addresses, may be used to infer aggregations.

Referring back to FIG. 1, in accordance with example implementations, a network manager 174 of the network 100 discovers aggregation information for network devices of the network 100 and uses the discovered information for such purposes as monitoring the statuses of network connections (e.g., determining whether a given connection is "up" or "down") and monitoring the performances of the network connections (monitoring the number of dropped packets and errors of a given network connection, and so forth).

Figure 3:
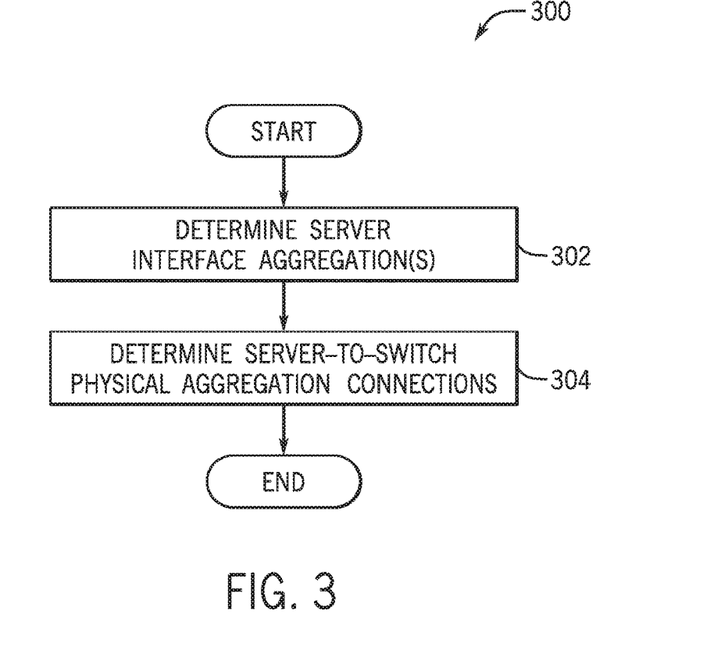
FIG. 3 is a flow diagram depicting a technique to discover server interface aggregation information according to an example implementation.

For purposes of discovering aggregation information for a given server 110 of the network 100, the network manager 174 generally performs a technique 300 that is depicted in FIG. 3. Referring to FIG. 3 in conjunction with FIG. 1, pursuant to the technique 300, the network manager 174 determines (block 302) one or multiple server interface aggregations of the server and determines (block 304) the server-to-switch physical aggregation connections (otherwise called the "L2 connections" or "L2 links") for the server interface aggregation(s).

Referring back to FIG. 1, a given server 110, such as example server 110-1, is a physical machine that is formed from actual hardware and actual machine executable instructions, or "software." For example, the server 110-1 has one or multiple central processing units (CPUs) 130, as well as other hardware, such as the network interfaces 150, non-transitory memory storage devices that collectively form a memory 119, and so forth. The machine executable instructions, or software, of the server 110-1 may include, for example, instructions that when executed by the CPU(s) 130, form the VMs 120, the hypervisor 122, an operating system, and so forth. These instructions, as well as data associated with the execution of the instructions may be stored in a non-transitory computer readable storage media, such as the memory 119.

In accordance with example implementations, the other servers 110 are standalone servers that include such hardware as CPU(s), random access memory (RAM), static storage, NIC interfaces, and so forth.

As depicted in FIG. 1, for this example, the network manager 174 resides on a server 170 that is coupled to the network fabric 160. In general, the server 170 is also a physical machine that is formed from actual hardware and actual software. Moreover, the network manager 174 may, for example, be formed from a set of machine executable instructions that may be stored in a non-transitory computer readable storage medium, such as a memory 177 of the server 170, and executed by one or more CPUs 176 of the server 170. In accordance with example implementations, the network manager 174 may execute on a Windows or Linux platform. Also, in accordance with example implementations, the server 170 may be a standalone server and may include hardware similar to that described above for the standalone servers 110.

For the example that is depicted in FIG. 1, the server 110-1 is simple network management protocol (SNMP) capable, in that the server 110-1 has a management information base (MIB) 122 that can provide information to the network manager 174 regarding the network objects of the server 110-1, which are coupled to the network fabric 160. In this regard, for this example, the server 110-1 is a network managed device, and has a corresponding SNMP agent 140 to provide the MIB information to the network manager 174. As discussed below, the SNMP agent 140 may provide information in the form of an interfaces table and an ifStack table.

Not all of the servers 110 may, however, be SNMP capable or may be partially SNMP capable. In other words, a given server 110 may not be capable of providing certain MIB information, such as the MIB interfaces or ifStack tables. For example, certain MIB information may not be available or may not be loaded onto the server 110. Thus, a given server 110 may provide no or partial MIB information, as further described herein.

In general, traditionally, MIBs for network devices, such as switches and routers, have been available. However, servers running traditional operating systems, such as Windows or Unix, may not provide access to SNMP MIBs that identify port and connection redundancies. In this manner, datacenter operators may not load such MIBs on the servers, and many cases, no SNMP capabilities may not be provided by a given server 110. This makes SNMP-based identification of the server interface aggregations and aggregation connections potentially challenging for the network manager 174. As described herein, the network manager 174 may discover server interface aggregations and switch-to-server interface aggregations for a large number of different operating system-based platforms, such as platforms that run Windows, Linux, Solaris, HPUX and AIX operating systems, as examples.

Figure 4:
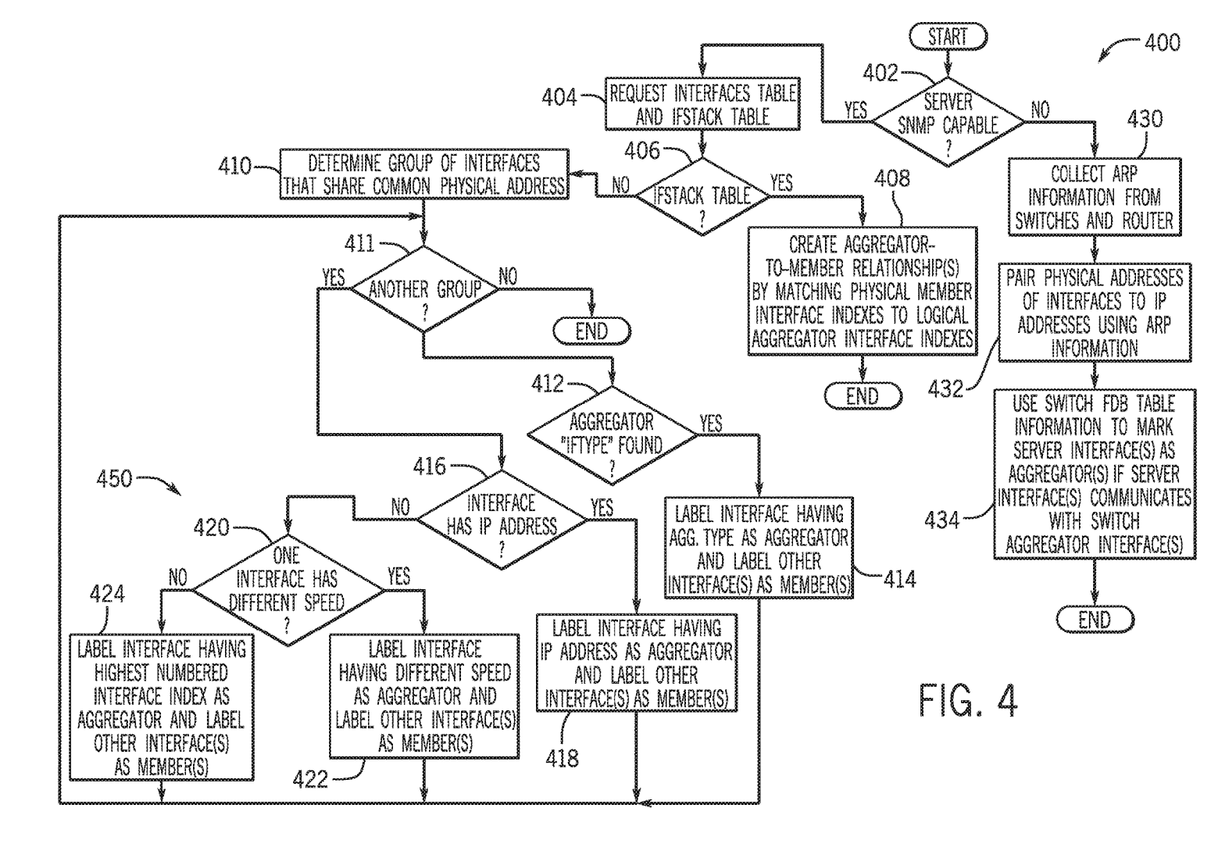
FIG. 4 is a flow diagram representing a technique to determine server interface aggregation information in a manner that accommodates different degrees of system network management protocol (SNMP) capabilities of the server according to an example implementation.

Referring to FIG. 4 in conjunction with FIG. 1, in accordance with example implementations, the network manager 174 performs a technique 400 for purposes of identifying server interface aggregations and identifying the switch-to-server physical aggregation connections (i.e., the L2 connections) for a given server (such as one of the servers 110). The technique 400 accommodates different degrees of information that may be provided by a given server about its aggregation information.

Pursuant to the technique 400, the network manager 174 first determines (decision block 402) whether the server supports SNMP, or is "SNMP capable." If so, the network manager 174 requests (block 404) the SNMP-based interfaces table and the ifStack table from the server. In general, the interfaces table identifies the logical network interfaces of the server and the corresponding characteristics of these logical interfaces, such as physical addresses, Internet protocol (IP) addresses, aggregation labels, and so forth. The ifStack table identifies a hierarchical relationship among the logical network interfaces of the server.

The server may or may not, however, provide an ifStack table, even if the server is SNMP capable. If the server provides the ifStack table (decision block 406), then the network manager 174 creates (block 408) aggregator-to-member relationships by matching physical member interface indexes to logical aggregator interface indexes, using both the interfaces table and the ifStack table. If, however, the server does not support the ifStack table (decision block 406), then the network manager 174 processes the interfaces table and makes various assumptions based on the information found in this table.

More specifically, in accordance with example implementations, the network manager 174 performs the following technique. First, by examining the interfaces table, the network manager 174 determines (block 410) one or multiple groups of server network interfaces that share a common physical address. In this regard, the network manager 174 considers network interfaces that share a common physical address, such as a MAC address, as belonging to a server aggregation group. Next, the network manager 174 begins a process (by deciding whether there is another group to process in decision block 411) to identify the aggregator for each of the identified aggregation group(s).

More specifically, one way to identify the aggregator for a given group is for the network manager 174 to determine (decision block 412) whether a specific label, or aggregator "iftype" (or "IANAiftype"), is present in the interfaces table. For example, a given logical network interface acting as an aggregator may be of an ifType ieee8023adLag, propMultiplexor or another type. If a given logical network interface is associated with one of these labels, then, in accordance with example implementations, the network manager 174 labels (block 414) the interface as being the aggregator and labels the other logical interface(s) of the aggregation as being member(s) of the aggregation. Control then returns to decision block 412 to process the next group of interfaces.

If in decision block 412 the network manager 174 fails to find the aggregator iftype label (pursuant to decision block 412), then the network manager 174 proceeds to identify the aggregator based on other criteria. More specifically, the network manager 174 determines (decision block 416) whether one of the logical interfaces has an IP address. If so, the network manager 174 labels the interface having the IP address as the aggregator and labels the other interface(s) as member(s), pursuant to block 418. Control then returns to decision block 411 to process the next aggregation, if any.

If, however, pursuant to decision block 416, the network manager 174 does not find an IP address, the network manager 174 applies a different criteria to identify the aggregation. In this manner, the network manger 174 determines (decision block 420) whether one of the logical network interfaces has a different speed. If so, the network manager labels the interface having the different speed as the aggregator and labels the other interface(s) as a member(s) of the aggregation, pursuant to block 422. Control then returns to decision block 411 to process the next aggregation, if any.

Lastly, if the network manager 174 does not, pursuant to decision block 420, determine that one of the logical interfaces has a different speed, then the network manager 174 labels the interface having the highest numbered interface index as the aggregator and labels the other interface(s) as the member(s) of the aggregation, pursuant to block 424. Control then returns to decision block 412.

If the network manager 174 determines (decision block 402) that the server is not SNMP capable, then the interfaces and ifStack tables are not available, and the network manager 174 identifies aggregation information based on other criteria. In this manner, the network manager 174 collects (block 430) address resolution protocol (ARP) information from the switches and routers of the network fabric 160 to pair (block 432) physical addresses of the logical interfaces to IP addresses using the ARP information. By using forward database (FDB) table information, the network manager 174 identifies (block 434) a given server network interface as an aggregator if the server interface communicates with the switch's aggregator interface. It is noted that for this case, the aggregation includes no members other than the aggregator, because the SNMP interface information is not available from the server.

It is noted that each server operating system presents its network interface model using a different SNMP interfaces table representation. For example, Linux is relatively simplistic in responding with a grouped interface aggregation. Windows® is relatively complex offering a relatively large number of logical interfaces as potential aggregator candidates. A Solaris operating system may provide the aggregator interface with no members, while HPUX provides the SNMP interface information closer to Linux. Thus, the network manager 174 may modify its heuristics for server aggregator identification as new operating systems are added to the supported list.

After discovering a given server network interface aggregation, the network manager 174 next discovers the physical, or L2, connections, which physically connect the server interfaces to the switch interfaces. The L2 connections may be discovered from either the server or the switch side. In this regard, different switch-side and server-side aggregations and corresponding connections are formed over the course of time. Thus, the network manager 174 uses both server-side connection discovery (FIG. 5) as well as switch-side connection discovery (FIG. 6), in accordance with example implementations.

Figure 5:
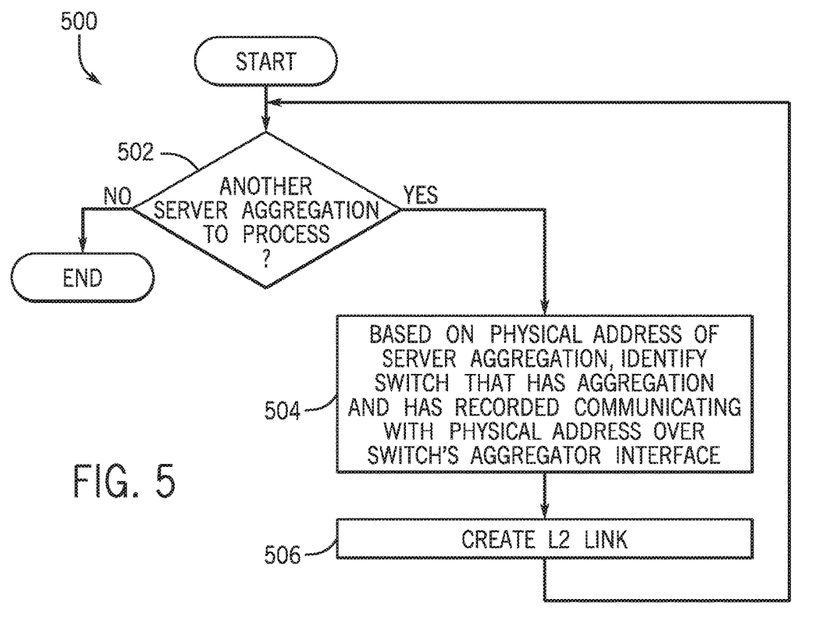
FIG. 5 is a flow diagram depicting server-side discovery of server-to-switch physical aggregation connections according to an example implementation.

FIG. 5 is an illustration of a server-side connection discovery technique 500 in accordance with example implementations. Referring to FIG. 5 in conjunction with FIG. 1, the technique 500 includes the network manager 174 determining (decision block 502) whether there is another server aggregation to process for purposes of determining the corresponding L2 connections for this aggregation. If so, the technique 500 includes the network manager 174 identifying a switch that has an aggregation and has recorded communicating with a physical address of the server aggregation over the switch's aggregator interface, pursuant to block 504. If such a switch is identified, the network manager 174 creates (block 506) the corresponding L2 link (i.e., identifies the L2 physical connection). Control then returns to decision block 502 for purposes of processing any further server aggregations.

Figure 6:
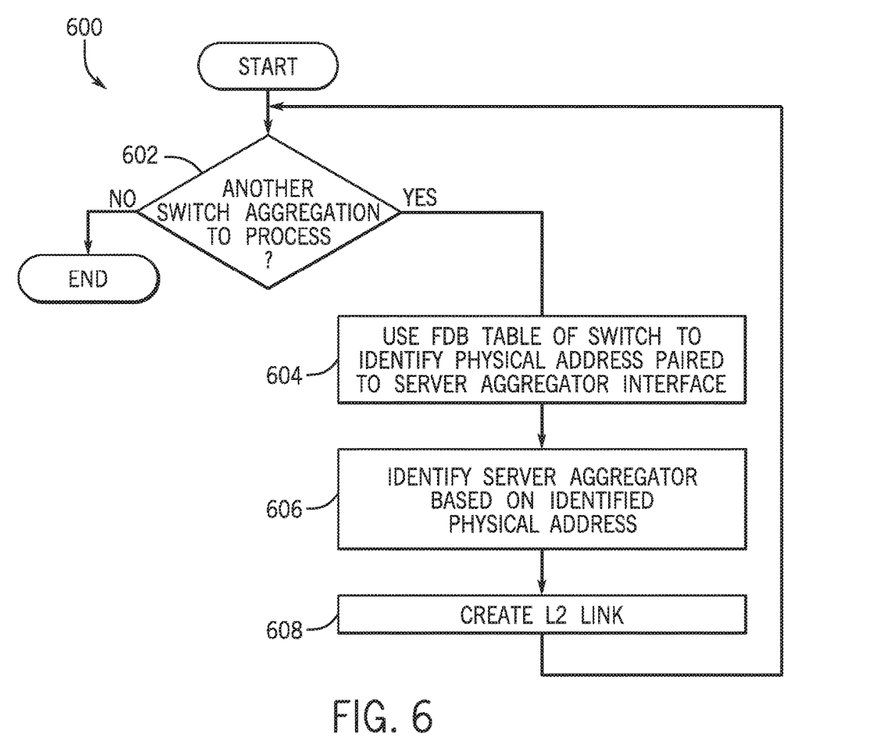
FIG. 6 is a flow diagram depicting switch-side discovery of server-to-switch physical aggregation connections according to an example implementation.

FIG. 6 depicts a switch-side connection discovery technique 600 that may be used by the network manager 174, in accordance with example implementations. Pursuant to the technique 600, the network manager 174 determines (decision block 602) whether there is another switch aggregation to process. If so, the network manager 174 uses (block 604) the FDB table of the switch to identify the physical address paired to a server aggregator interface. If one is found, the network manager 174 identifies (block 606) the server aggregator for the aggregation and creates (block 608) the corresponding L2 link before control returns to decision block 602.

Among the possible advantages of the systems and techniques that are disclosed herein, server interface aggregations as well as L2 connections are discovered, which are both important for maintaining accessibility of servers. Moreover, server aggregations and L2 connections may be identified even when one or multiple servers do not support SNMP. The systems and techniques that are disclosed herein allow incident alerting when member(s) of a given server aggregation are faulting or faulting when an entire aggregation has faulted. The systems and techniques that are disclosed herein permit incident alerting when the server's aggregate L2 link to its access switch or switches have faulted. Virtual server aggregations may be identified and correctly monitored for operational status, bandwidth utilization, and other monitored conditions. Other and different advantages are contemplated, in accordance with other example implementations.

Other implementations are contemplated and are within the scope of the appended claims. For example, although server-to-switch link aggregations are described in the examples above, the network manager 174 may find heterogeneous network equipment aggregations using the same techniques. For example, a network switch made by a first company may have a link aggregation to a network switch made by a second company, but neither device's SNMP agent may provide standard MIB aggregation responses that contain data identifying the aggregations and allow linking of the aggregations. However, using the above-described techniques, the network manager 174 may find and link aggregations between heterogeneous network equipment. Because network switches tend to support the ifStack MIB, the network manager 174 may use this information to create and link the aggregations, but the other techniques described above may also be used.

Likewise, in accordance with further example implementations, the network manager 174 may use techniques that are disclosed herein to find router-to-switch and router-to-router aggregations.

Figure 7:
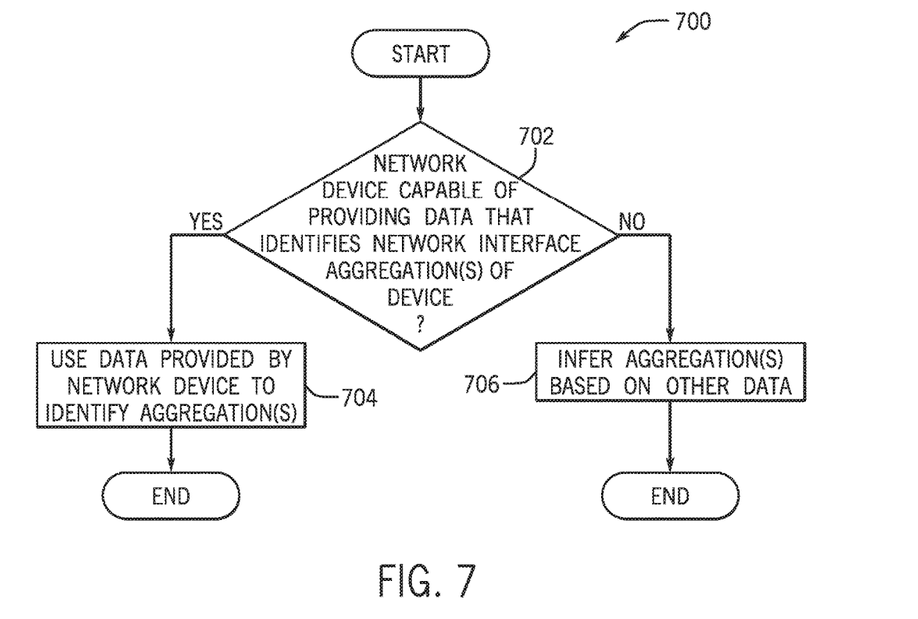
FIG. 7 is a flow diagram depicting a technique to discover aggregation information for a network device according to an example implementation.

Thus, referring to FIG. 7, in general, the network manager 174 performs a technique 700 that includes determining (decision block 702) whether a given network device is capable of providing data that identifies network interface aggregation(s) of the device. If so, the network manager 174 uses the data to identify the aggregation(s), pursuant to block 704. Otherwise, the network manager infers (block 706) the aggregation(s) based on other data that may or may not be provided by the device, as described herein.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   determining network interface aggregation information for a given network device, wherein determining the aggregation information comprises:
   determining whether the given network device is capable of providing first data identifying an aggregation, wherein determining whether the given network device is capable of providing the first data identifying the aggregation comprises determining at least one of determining whether the network device supports a protocol associated with providing aggregation information or determining whether the network device stores an aggregation information table; and inferring the aggregation information for the given network device based at least in part on other data provided by a plurality of network devices other than the given network device in response to a determination being made that the given network device is incapable of providing the first data.

2. The method of claim 1, wherein inferring the aggregation information for the given network device comprises:

retrieving an interface stack table identifying a hierarchical relationship among network interfaces; and determining the aggregation information for the given network device based at least in part on the hierarchical relationship.

3. The method of claim 1, wherein inferring the aggregation information for the given network device comprises:

identifying a group of network interfaces that share a physical network interface in common; and identifying an aggregator of the group.

4. The method of claim 3, wherein identifying the aggregator of the group comprises:

determining whether a label of a given interface of the identified group of interfaces is associated with an aggregator type.

5. The method of claim 1, wherein inferring the aggregation information for the given network device comprises determining the aggregation information for the given network device based at least in part on address resolution protocol (ARP) information.

6. The method of claim 5, wherein inferring the aggregation information for the given network device further comprises:

pairing physical addresses of a plurality of network interfaces to Internet Protocol (IP) addresses using the ARP information; and using switch forward database (FDB) table information to identify the given network interface as an aggregator based on whether the given network interface communicates with another aggregator.

7. The method of claim 1, further comprising:

determining a physical connection for an aggregation that includes the given network device, wherein determining the physical connection comprises, based on a physical address of the aggregation, identifying another network device that has an aggregation that has recorded communicating with a physical address of the determined aggregation.

8. The method of claim 1, further comprising:

determining a physical connection for an aggregation including the given network device, wherein determining the physical connection comprises using a forward database (FDB) table to identify a physical address paired to a network interface of the network device.

9. A system comprising:

a server comprising a plurality of server interfaces;

at least one switch; and a network manager to:

determine whether the server is capable of providing first data identifying a server interface aggregation;

infer information for a server interface aggregation for at least two server interfaces of the plurality of server interfaces based at least in part on other data provided by a plurality of other network devices other than the server in response to a determination being made that the server is incapable of providing the first data; and determine at least one physical connection between the server and the at least one switch for the server interface aggregation for the at least two server interfaces.

10. The system of claim 9, wherein the network manager requests a stack interface table from the server, and the network manager determines the server interface aggregation for the at least two server interfaces based at least in part on a response to the request from the server.

11. The system of claim 9, wherein the network manager bases the determination of the server interface aggregation for the at least two server interfaces at least in part on whether the server supports a simple network management protocol (SNMP).

12. The system of claim 9, wherein the network manager performs performance analysis for the determined server interface aggregation for the at least two server interfaces.

13. An article comprising a non-transitory storage medium to store instructions that when executed by a computer cause the computer to:

determine whether a server is capable of providing first data identifying a server interface aggregation, wherein determining whether the server is capable of providing the first data comprises determining at least one of whether the server supports a protocol associated with providing aggregation information or determining whether the server stores an aggregation information table; and inferring server interface aggregation information for a server interface aggregation for the server based at least in part on other data provided by a plurality of other network devices other than the server in response to a determination being made that the server is incapable of providing the first data; and determining a server-to-switch physical connection for the server interface aggregation for the server.

14. The article of claim 13, the storage medium storing instructions that when executed by the computer causes the computer to base the inference of the server interface aggregation information at least in part on whether the server supports a simple network management protocol (SNMP).

15. The article of claim 13, the storage medium storing instructions that when executed by the computer causes the computer to infer the server interface aggregation information based at least in part on whether the server provides information about a hierarchical relationship among server network interfaces of the server.

* * * * *